Jan. 3, 1956  E. P. SACREY  2,729,458
COUPLING STRUCTURE
Filed Dec. 22, 1952  4 Sheets-Sheet 1
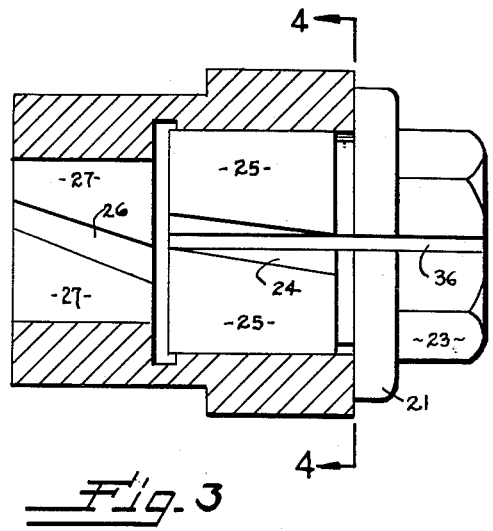
Fig. 3
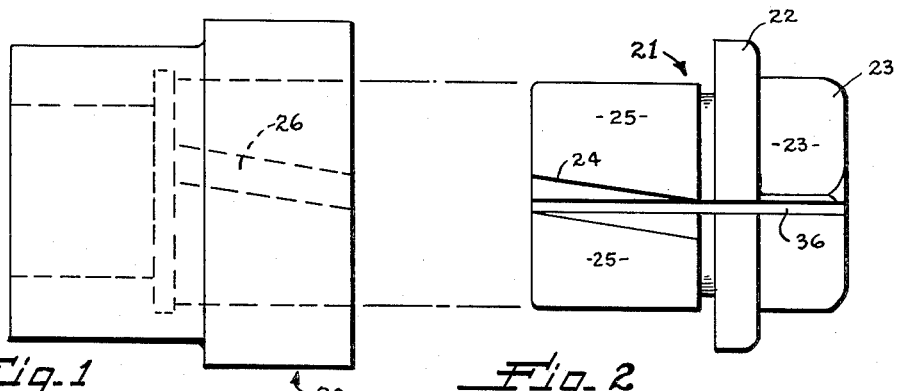
Fig. 1   Fig. 2
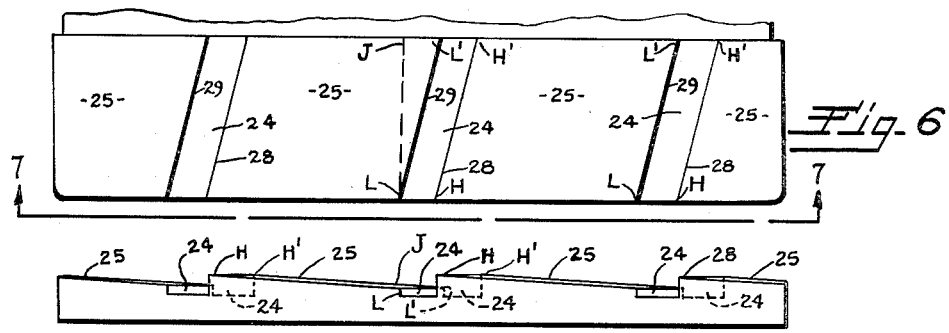
Fig. 6
Fig. 7
INVENTOR.
ELMER P. SACREY, deceased
CALEB CANDEE BROWN, Jr.
BY  Executor
D. Emmett Thompson
Attorney Jan. 3, 1956 E. P. SACREY 2,729,458
COUPLING STRUCTURE
Filed Dec. 22, 1952 4 Sheets-Sheet 2

INVENTOR.
ELMER P. SACREY,
deceased
BY CALEB CANDEE BROWN, Jr.
executor

D. Emmett Thompson
Attorney

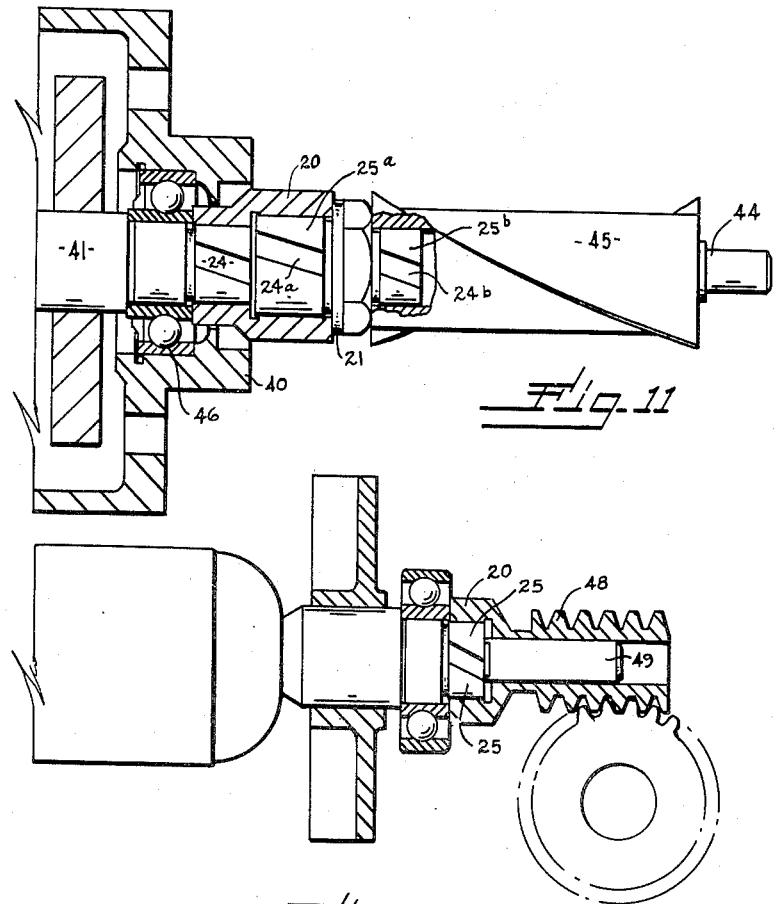
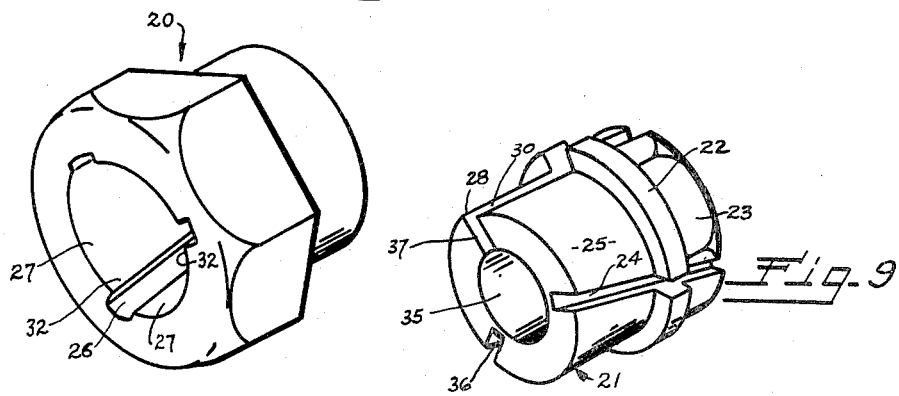

Jan. 3, 1956         E. P. SACREY         2,729,458
COUPLING STRUCTURE
Filed Dec. 22, 1952         4 Sheets-Sheet 4
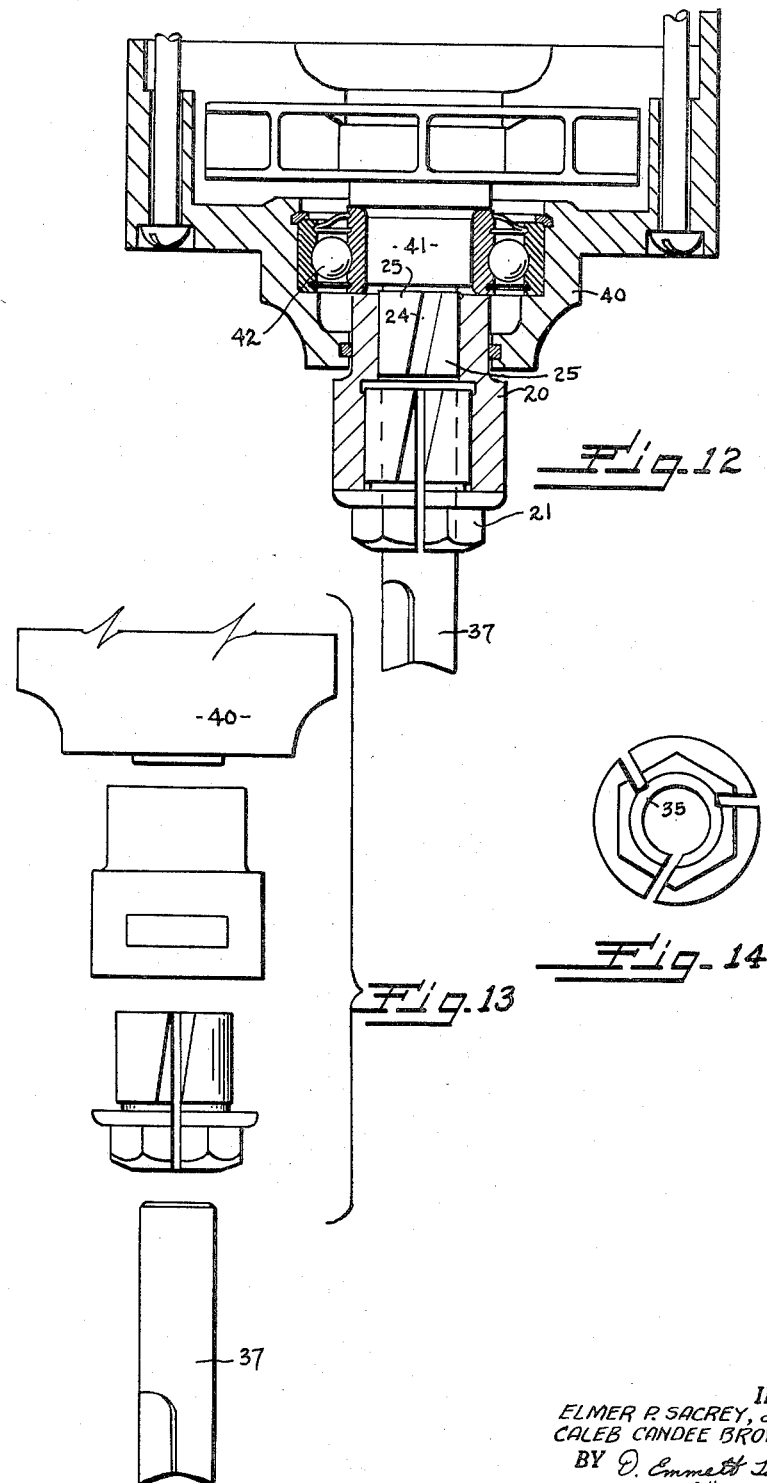
INVENTOR.
ELMER P. SACREY, deceased
CALEB CANDEE BROWN, Jr., Executor
BY D. Emmett Thompson
Attorney

United States Patent Office 2,729,458
Patented Jan. 3, 1956

2,729,458

COUPLING STRUCTURE

Elmer P. Sacrey, deceased, late of Syracuse, N. Y., by Caleb Candee Brown, Jr., executor, assignor to Ruth Gale Sacrey Application December 22, 1952, Serial No. 327,398

7 Claims. (Cl. 279—41)

This invention relates to coupling structure, and more particularly to a coupling structure for joining two machine elements which rotate at high speed and which have to run true with great accuracy. An example of such an arrangement is the coupling of material cutting bits to the power shaft of routers of the type disclosed in Patent No. 2,613,704, issued October 14, 1952.

In routing machines of the type referred to, the power shaft and the cutter bit carried thereby rotate from 20,000 to 25,000 R. P. M. Inasmuch as these bits vary in size and shape, depending upon the work being done, it is necessary to provide a coupling structure which will permit the cutting bits to be conveniently changed. Heretofore, the coupling structure has consisted of a screw type collet. However, this type of collet has many disadvantages inherent in its structure. For instance, in order for easy assembly and disassembly, the threads on the collet element and in the power shaft must be formed with clearance and, due to the haphazard pressure pattern within the threads, this clearance is taken up by forcing the threads to one side or the other when the parts are tightened. This results in the collet element not running true in the power shaft or chuck element. This situation is further aggravated by the collection of dirt in the crevices of the threads, which is difficult to remove, and this foreign material adds to the eccentricity of the collet element.

Furthermore, the screw thread arrangement does not exert high pressure to constrict the collet element onto the shank of the bit, with the result that the bit slips in the collet element. This slipping promotes galling of the bit shank or arbor, causing them to become mis-shapen and again adding to the eccentricity of the bit or cutter, and this slippage is further troublesome in that it permits axial movement of the cutter relative to the machine and therefore, relative to the work piece, spoiling the latter.

If the cutter bit "runs out," the cutting edges of the bit will not have the same bite on the work, with the result on cuts where the bit is cutting the edge of the wood, the cut will not be smooth. When cutting into the work where two or more edges of the cutter simultaneously engage the wood, the router will chatter and kick, and the cutting edge of the bit moving in the greater circle and therefore doing most of the cutting, will dull quickly and further aggravate the unbalanced condition.

The disadvantages of the threaded coupling structure enumerated above in connection with the mounting of router bits exists to a great extent in the coupling of many machine elements which rotate at excessively high speeds, as, for example, the mounting and coupling of gears to high speed motor shafts.

This invention has as an object a coupling structure comprising male and female members having complemental cam surfaces which are particularly economical to machine or form, and which function, when the members are joined, to provide a coupling of great precision, whereby the parts joined by the coupling structure run true with great accuracy.

The invention has as a further object a coupling structure of the type referred to wherein the female member, if in the form of a collet, is constricted by great inward radial pressure effecting a high pressure clamping action on an element positioned in the collet member.

The invention consists in the novel features and in the combinations and constructions hereinafter set forth and claimed.

In describing this invention, reference is had to the accompanying drawings in which like characters designate corresponding parts in all the views.

In the drawings—

Figure 1 is a side elevational view of a socket member of the coupling.

Figure 2 is a side elevational view of the male member of the coupling.

Figure 3 is a vertical sectional view of the socket with the male member inserted therein and shown in side elevation.

Figure 6 is a developed view of the peripheral surface of the male member.

Figure 7 is an end view looking upwardly, as indicated by line 7—7, Figure 6.

Figure 8 is a perspective view of the socket member.

Figure 9 is a perspective view of the male member.

Figure 10 is a view, partly in section, illustrating the use of the coupler for mounting a worm gear on a motor shaft.

Figure 11 is a view, partly in section and partly in elevation, illustrating the use of the coupler for mounting an arbor and cutter carried thereby to a motor shaft.

Figure 12 is a fragmentary vertical sectional view of a motor driven router illustrating the coupling structure attached to the motor shaft and the cutting tool attached to the coupler.

Figure 13 is an exploded view of the coupling elements shown in Figure 12.

Figure 14 is an end view in elevation of the coupler.

Figure 5:
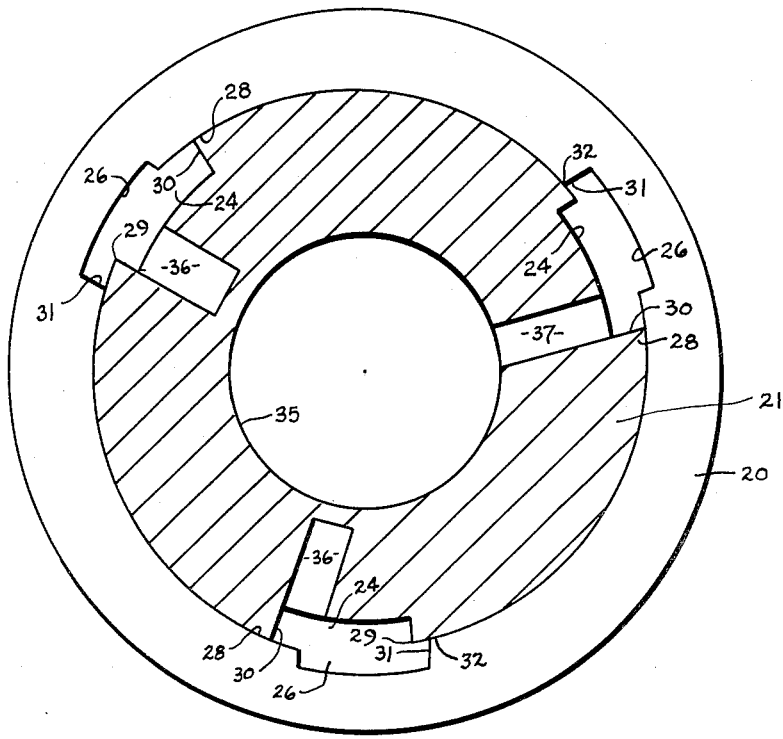
Figure 5 is a view, similar to Figure 4, with the male member rotated into locking engagement with the socket member.

The coupling structure consists of a socket member 20 of cylindrical formation, and a male member 21 having a portion adapted to be positioned in the bore of the socket member 20.

In Figures 1 to 4 and 9, the male member is in the form of a contractile collet for gripping and holding a work piece, or the shank portion of a cutting tool and, in this instance, is formed with a radially extending flange 22 intermediate its ends adapted to abut against the confronting end surface of the socket member, as shown in Figure 3. The outer end portion of the male member is formed with a series of flat surfaces 23 to form a non-circular portion, as a hexagon, for the reception of a wrench to tighten and loosen the member in the socket. That portion of the male member adapted for insertion within the bore of the socket is formed with a plurality of circumferentially spaced apart helically extending grooves 24, and with helically extending eccentric cam surfaces 25 intermediate the grooves.

In the drawings, the male member 21 is formed with a series of three of the grooves 24 and three of the eccentric cam surfaces 25, the cam surfaces all being eccentric in the same direction and being of constant rise.

The bore of the socket member 20 is formed with a series of grooves 26 and with eccentric cam surfaces 27.

The grooves 26 and cam surfaces 27 are complemental to the grooves 24 and cam surfaces 25—that is, the grooves 26 and the cam surfaces 27 also extend helically, but the eccentric cam surfaces 27 extend circumferentially in opposite direction to the cam surfaces 25. With this arrangement, the high points 28 of the cams 25 form shoulders 30 engageable against shoulders 31 formed by the high points 32 of the cams 27 in the socket member, as clearly shown in Figure 4.

Figure 4:
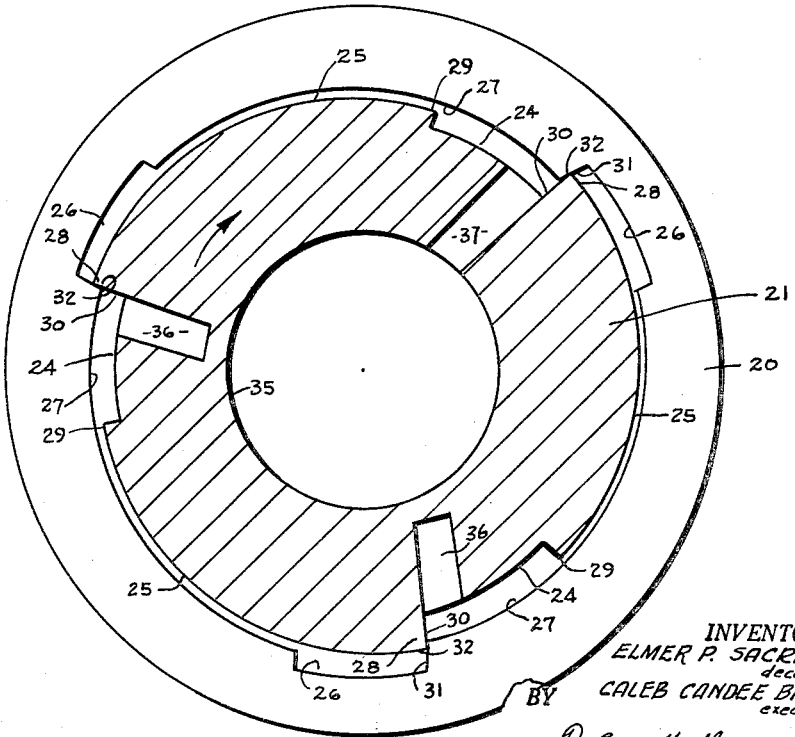
Figure 4 is a view taken on a line corresponding to line 4—4, Figure 3, with the male member initially positioned in the socket member.

The male member 21 is inserted into the socket member with the parts positioned as shown in Figure 4. When the male member is rotated in a clockwise direction, Figure 4, the eccentric cam surfaces 25, 27, engage and this engagement is illustrated in Figure 5. Because the cam surfaces rise in opposite directions, this engagement is effected upon a relatively small rotative movement between the socket and the male member. The formation of the cam surfaces 25 is shown in Figures 6 and 7. As previously stated, the grooves extend helically or in angular relation to the axis of the coupling. That is, the high edges 28 of the cam surfaces extend helically and in like manner, the whole of each cam surface so extends helically to the low edge 29. The points H, H', indicate points at the outer and inner ends of the high edge 28. The points L, L', are points at the outer and inner ends of the low edge 29. The points H, H', are the same distance from the axis, and likewise the points L, L', an equal distance from the axis of the coupling. J indicates a point projected axially from point L and due to the helical formation of the surfaces 25, this point J is higher or farther from the axis than point L. Accordingly, insertion or withdrawal of the collet member 21 with reference to the socket, or chuck member 20, can not be axial because a point, such as J, is higher than an axially alined point, such as L. The movement must be helical so that the point L' must go through the point on the bore of the socket previously occupied by point L.

With the male member 20 constituting a collet, this member is formed with a bore 35 for receiving an element to be driven by the coupling, as the shank of a cutter, and the male member is formed with slots 36 which may be coextensive with the grooves 24, as shown in Figure 9. However, the slots 36 are more narrow than the grooves 24 and extend parallel to the axis of the bore 35, as shown in Figures 2 and 3. One of these slots, as slot 37, extends radially from the bore. These slots permit constriction of the male member to decrease the diameter of the bore 35 and effectively grip the shank of the cutting tool 37, see Figure 12.

The grooves 24 serve two purposes in that they provide clearance space for the relieving tool or cutter in the formation of the eccentric cam surfaces 25, 27, and secondly, they provide sharply defined abutting shoulders or surfaces 30, 31, to correctly orient and position the parts relatively upon initial insertion of the male member into the bore of the socket, and to form a stop when the male member is moved in retrograde direction for unloosening the coupler. The helical formation of the grooves and the cam surfaces function to draw the male member, or the flange 22 thereof, against the end of the socket and to maintain the flange in engagement therewith.

The coupling members 20, 21, are economically machined as by broaching the grooves 24, 26, and by forming the cam surfaces 25, 27, by means of a relieving attachment on the boring or turning machine. After the parts have been initially machined and heat treated, the cam surfaces may be ground in the same manner, and in the same setting, the outer end of the socket member face ground and likewise, the confronting surface of the flange 22, all whereby when the socket and male member are assembled, the parts run with very high precision.

Figure 12 illustrates the coupling structure employing the male member in the collet form for driving a cutter 37. In this structure, 40 designates the lower end of a router frame, in which there is journalled vertically, a motor shaft 41 in bearings 42, the lower portion of which is shown in the view. In this arrangement, the invention is also employed to attach the socket member 20 of the collet coupling to the motor shaft. The end portion of the shaft 41 is machined to provide the male member of the coupling. In this case, the socket member 20 is formed at both ends of its bore with the grooves 26 and cam surfaces 27, the inner portion of the socket bore coacting with the end of the motor shaft 41, and the outer portion of the bore coacting with the male collet member 21 of the type previously described, whereby the coupling structure is employed to attach the socket member to the motor shaft and to attach the cutting tool 37 to the socket.

In Figure 11, the motor shaft 41 forms a male member of the coupling structure, the socket member 20 of which is constructed similarly, as in Figure 12. A male member 21 is mounted in the outer bore of the socket—in this instance, the male member constituting one end of a tool supporting arbor 44. The arbor is also formed at its inner end with the helical grooves $24^a$ and cam surfaces $25^a$. The arbor is formed with the flange 21 abutting the outer end of the socket, and contiguous to the flange it is formed with helical grooves $24^b$ and cam surfaces $25^b$. The latter grooves and cam surfaces form the male member of a third portion of the coupling structure, in which the socket portion is formed in one end of the cutter 45, all whereby the coupling structure is employed to detachably mount the cutter 45 on the arbor 44, mount the arbor in the socket 20, and to mount the socket 20 on the end of the motor shaft 41.

In this structure, the inner end of the socket abuts against the inner race of the ball bearing 46 which, of course, is square with the axis of the shaft 41. The flange 21 on the arbor abuts against the outer end of the socket and the inner end of the cutter 45 abuts against the flange 21 on the arbor. Inasmuch as the coacting cam surfaces, the ends of the socket members and the flange 21 are all ground true with the axis of the coupling structure and the parts are held in abutting engagement by the helical formation of the cam surfaces, all parts of the structure run true and are adequately supported. However, the parts are quickly assembled and may be instantly separated upon a slight relative retrograde movement between the parts.

Figure 10 illustrates the coupling structure in the mounting of a worm gear 48 on a motor shaft 49, in which instance, one end of the worm 48 constitutes the socket member 20 and the contiguous portion of the motor shaft 49 forms the male member of the coupling.

What is claimed is:

1. A coupling structure comprising a socket member and a male member adapted to be positioned in the bore of the socket member, said members being formed on their confronting surfaces with a plurality of circumferentially spaced helically extending grooves and having spirally extending cam surfaces intermediate said grooves, the cam surfaces in one member extending circumferentially in opposite direction to the cam surfaces on said other member.

2. A coupling structure comprising a socket member and a male member adapted to be positioned in the bore of the socket member, said members being formed on their confronting surfaces with three spirally extending eccentric cam surfaces uniformly spaced circumferentially, a helically extending groove intermediate the high point of each cam surface and the low point of the next cam surface, the cam surfaces of one member extending in opposite direction to the cam surfaces of said other member.

3. A coupling structure comprising a socket, a collet adapted for insertion in the socket, said collet being formed on its periphery with three circumferentially spaced helically extending grooves and having eccentric spirally extending cam surfaces intermediate said grooves, the bore of said socket being formed with complemental coacting grooves and cam surfaces, the cam surfaces in the socket extending in opposite circumferential direction to the cam surfaces on the collet.

4. A collet chuck comprising a socket member and a male member adapted to be positioned in the bore of the socket member, said members being formed on their confronting areas with a plurality of cam surfaces which are of spiral formation in a plane perpendicular to the axis of the chuck, and said cam surfaces being helically twisted about said axis, and said members having abutting faces in a plane perpendicular to said axis.

5. A collet chuck comprising a socket member and a male member adapted to be positioned in the bore of the socket member, said members being formed on their confronting areas with a plurality of cam surfaces formed eccentrically with reference to the axis of the chuck, and extending helically in a direction lengthwise of said axis.

6. A collet chuck comprising a socket member and a male member adapted to be positioned in the bore of the socket member, said male member being formed on its periphery with a plurality of cam surfaces, the bore of said socket being formed with complemental coacting cam surfaces, the cam surfaces on both members being formed spirally in a plane perpendicular to the axis of the chuck and extending helically in a direction lengthwise of said axis, the cam surfaces on one member being adapted to engage and lock against the cam surfaces on said other member when the male member is rotated in reference to the socket member, and said members having abutting faces extending in a plane perpendicular to the axis of the chuck.

7. A collet chuck structure comprising a body member formed with an axially extending bore and having a nose end faced square with the axis of said bore, a slotted compressible member adapted to be positioned within said bore, said compressible member being formed with an axially extending hole to receive a tool or work piece and having a radial flange adapted to bear against the nose end of the body member, the bore of the body member and the peripheral surface of said compressible member being formed with a plurality of complemental cam surfaces of spiral formation in a plane perpendicular to the axis of the chuck and extending helically in a direction lengthwise of said axis, said cam surfaces being adapted when said compressible member is turned within the body member to compress said body member upon the tool or work piece, and to draw the flange of said compressible member against the nose end of the body member.

References Cited in the file of this patent
UNITED STATES PATENTS

| | | |
|---|---|---|
| 1,514,641 | Urquhart | Nov. 11, 1924 |
| 2,234,486 | Craig | Mar. 11, 1941 |
| 2,322,420 | Craig | June 22, 1943 |